United States Patent [19]

Mergenthaler

[11] Patent Number: 4,779,706
[45] Date of Patent: Oct. 25, 1988

[54] SELF-SERVICE SYSTEM

[75] Inventor: Barry M. Mergenthaler, Cambridge, Ohio

[73] Assignee: NCR Corporation, Dayton, Ohio

[21] Appl. No.: 943,116

[22] Filed: Dec. 17, 1986

[51] Int. Cl.⁴ .......................... A47F 9/04; G07G 1/14
[52] U.S. Cl. ...................................... 186/61; 235/383
[58] Field of Search ..................... 186/56, 61; 235/383, 235/462; 177/50

[56] References Cited

U.S. PATENT DOCUMENTS

| 3,681,570 | 8/1972 | Abt ............................... 235/61.7 R |
| 3,836,755 | 9/1974 | Ehrat ............................... 186/61 X |
| 4,661,908 | 4/1987 | Hamano et al. ................ 235/383 X |
| 4,676,343 | 6/1987 | Humble et al. ........................ 186/61 |

FOREIGN PATENT DOCUMENTS

| 899018 | 6/1984 | Belgium . |
| 0178223 | 4/1986 | European Pat. Off. ............ 235/383 |
| 1927819 | 2/1971 | Fed. Rep. of Germany . |
| 2068132 | 8/1981 | United Kingdom . |

Primary Examiner—F. J. Bartuska
Attorney, Agent, or Firm—Wilbert Hawk, Jr.; Albert L. Sessler, Jr.; Richard W. Lavin

[57] ABSTRACT

A self-service checkout station allows a purchaser to scan coded labels on each merchandise item purchased and to generate the weight of the items at a first checkout counter. The weight of each merchandise item is compared with corresponding data stored in a remote memory member. If the weight of the item is found to be valid, the combined weight of the purchased merchandise items is then determined. The purchaser takes the purchased merchandise items to a second checkout counter where the combined weight of the merchandise items is again generated and compared with the previous generated combined weight. If the combined weights are found to be valid, the checkout operation is completed. A display member at the first checkout counter informs the purchaser of the price of each merchandise item being processed while a second display member at the second checkout counter displays the total amount due for the purchased merchandise items.

14 Claims, 2 Drawing Sheets

SELF-SERVICE SYSTEM

BACKGROUND OF THE INVENTION

I. Field of the Invention

The present invention relates to checkout systems and more particularly to a system allowing the customer to check out the purchased items.

II. Description of the Prior Art

In a merchandise checkout operation, an operator will move the purchased merchandise items past an optical scanner which scans a coded label on the purchased item and outputs electrical signals identifying the item. When the item is required to be weighed, the operator places the purchased item on a scale which weighs the item and generates signals representing the weight used in determining the price of the item. The operator then enters the price of the item into a data terminal device which prints the necessary data on a receipt which is then given to the customer after the customer has paid for the purchased items. The cost of the individual purchased items and the total cost of the items are displayed to the customer on a display associated with the terminal device. This operation of checking the purchased merchandise items is very costly in terms of using such a checkout operation in each checkout lane, in addition to being a relatively slow operation when a large number of merchandise items are being purchased. In order to overcome these drawbacks in the use of such a checkout system, self-service checkout systems have been proposed. In one system, the customer places an empty grocery cart on a scale and scans each purchased merchandise item by moving the item past a scanning mechanism. As each purchased item is scanned, a computer records its weight and price and generates a first combined weight of the items scanned. At the end of scanning each item, the customer places the item in the empty cart. The scale on which the cart is positioned generates a second combined weight which is used to verify that the accumulated weight of the items in the cart matches the combined weight of the individual purchased items scanned. The customer then takes his purchased items to a cashier who will complete the checkout operation only when there is a match between the first and second combined weight data. The disadvantage of this system is that items having the same weight but different values can be interchanged prior to the final checkout operation.

SUMMARY OF THE INVENTION

A merchandise checkout system includes a combined scanner/scale member which generates signals representing the weight of a purchased merchandise item placed on the scale and also scans a coded label placed on the item to identify it. The weight is then compared with corresponding data stored in a memory file. Audible and visible indications are given when the data generated by the scanner/scale member agrees with the data stored in the file. Each item scanned is placed in a bag that is located on a second scale. As each scanned merchandise item is placed in the bag, the weight of the item is checked with the weight of the item previously generated. If the weights do not match, the item must be rescanned. When a customer completes the scanning of all the purchased merchandise items, the customer operates a printer to print data on a slip listing the items in the bag and an identification number, which slip is then placed in the bag along with the purchased items. At a checkout station, the bags are weighed by a clerk who enters the identifying number in a data terminal device. If the total weight of the bag compares with the total weight generated by the scanner/scale member within a predetermined limit, the merchandise transaction is completed by the customer paying the total price of the transaction displayed on the terminal device.

It is therefore a principal object of this invention to provide a checkout system which increases the speed of the checkout operation.

It is another object of this invention to provide a checkout system having a high level of security in processing purchased merchandise items that enables a self-service operation to occur.

BRIEF DESCRIPTION OF THE DRAWINGS

These and other objects, features and advantages of the invention, as well as the invention itself, will become more apparent to those skilled in the art in view of the following detailed description taken into consideration with the accompanying drawings wherein like reference numerals indicate like or corresponding parts throughout the several views and wherein.

DESCRIPTION OF THE PREFERRED EMBODIMENT

Figure 1:
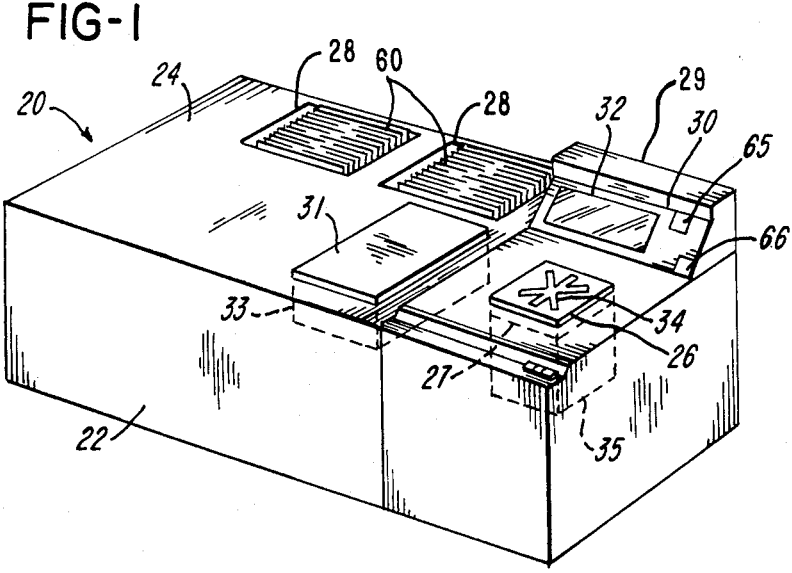
FIG. 1 is a perspective view of the scanning station of the present invention.

Referring now to FIG. 1, there is shown a perspective view of a scanning station generally indicated by the numeral 20 and utilized in the checkout system of the present invention which comprises a counter member 22 having a top supporting surface 24 on which is located the scanner/scale lid 26 of a scale mechanism 27, a pair of storage areas 28 for storing grocery bags 60 which hold the purchased merchandise items and a processing device 29 which includes a printer mechanism 30 and a display 32. The scanner/scale lid 26 includes a scanning window 34 through which scanning beams are projected from an optical scanning mechanism 35 positioned within the counter member 20 adjacent the scale member 27. Mounted on the surface 24 of the counter 20 is a second scale lid 31 associated with a scale mechanism 33 used in weighing the purchased merchandise items in a manner to be described more fully hereinafter. Reference may be made to U.S. Pat. No. 4,093,865, issued to F. G. Nicki on June 6, 1978 for a complete description of the mounting of a typical bar code scanner system within an enclosed housing such as a checkout counter, and to U.S. Pat. No. 4,656,344 issued to B. Menganthaler et al., for a complete description of the construction of the scanner/scale lid 26 which incorporates the scale member 27, and which is assigned to the assignee of the present application.

As is well-known in the art, the scanning beams outputted by the scanning mechanism 35 will scan a bar code label (not shown) positioned on the merchandise item for identifying the item, enabling the scanner mechanism to generate electrical signals representing the data read by the scanning mechanism when scanning the coded label.

Figure 2:
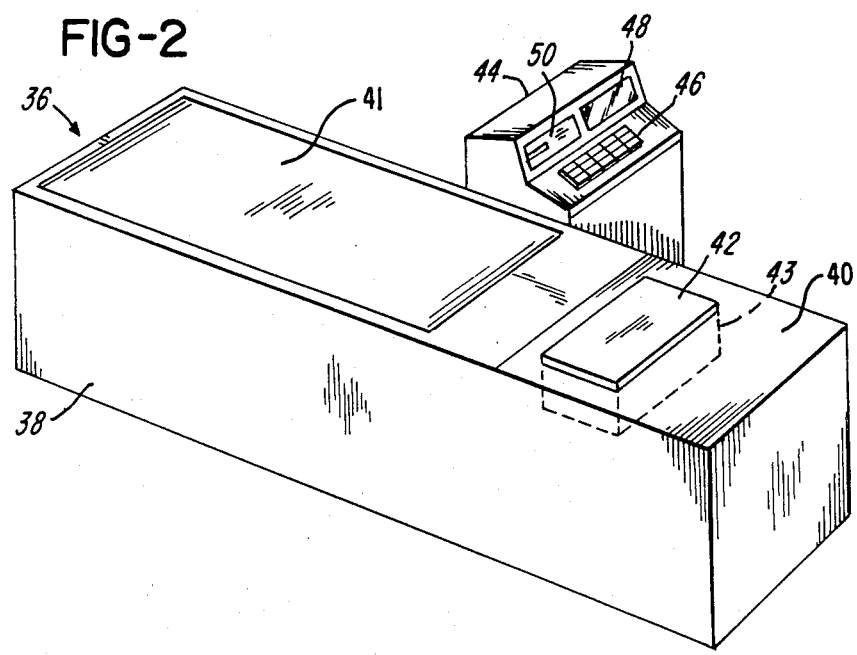
FIG. 2 is a perspective view of the finalization station of the present invention.
Figure 3:
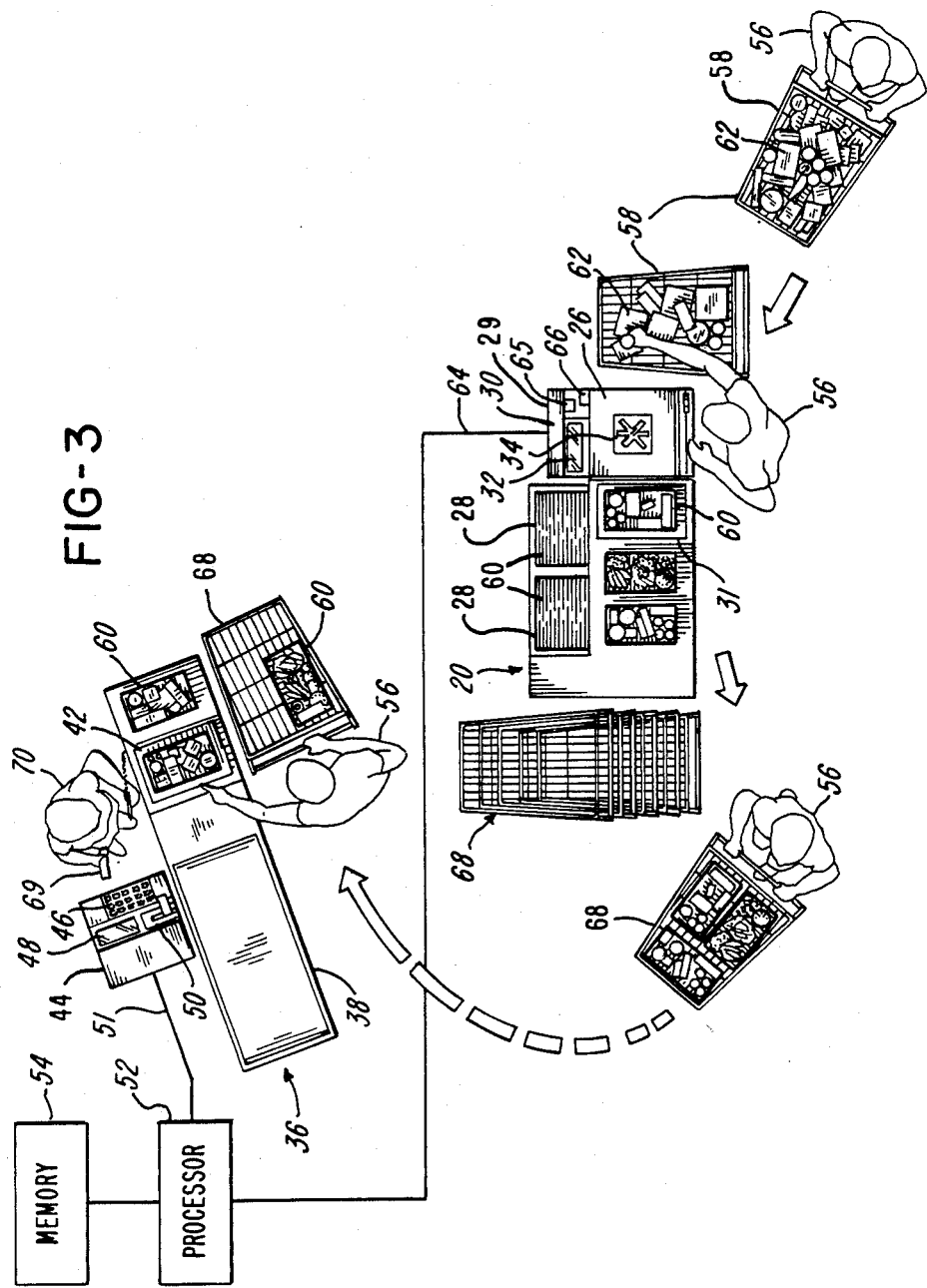
FIG. 3 is a plan view of the checkout station of the present invention.

Referring now to FIG. 2, there is shown a perspective view of the finalization station generally indicated by the numeral 36 and utilized in the checkout system of the present invention. The station 36 comprises a counter 38 having a top or supporting surface 40 in which is mounted a conveyor support member 41 and a scale lid 42 associated with a scale mechanism 43. Positioned adjacent the counter 38 is a data terminal device 44 which includes a keyboard 46, a display 48 and a printer 50. As shown in FIG. 3, the terminal device 44 is connected over a cable 51 to a processor 52 which in turn is connected to a remote memory unit 54. As will be described more fully hereinafter, data representing the weight and the price of each merchandise item carried by the store is stored in the memory unit 54.

Referring now to FIG. 3, there is shown a plan view of the checkout station of the present invention in which a customer 56 brings a grocery cart 58 containing the purchased merchandise items 62 to a position adjacent the scanning station 20. The customer 56 will remove a grocery bag 60 from one of the storage areas 28 in the counter 20 and will place the bag on the scale lid 31 on the counter 20. The customer will then remove each purchased merchandise item 62 from the cart 58 and position the item on the scanner/scale lid 26 with the coded label positioned adjacent the window 34. The scale member 27 (FIG. 1) associated with the lid 26 detects the positioning of the item on the lid. When the motion associated with the positioning of the item on the lid 26 stops, the scanning mechanism 35 (FIG. 1) is enabled to project scanning beams through the window 34 which scan the coded label positioned on the underside of the purchased merchandise item which has been positioned on the window 34. The processor 52 receives the data pertaining to the weight of each item and the identification data outputted by the scanning mechanism 35. The processor 52 will also generate the combined weight of the items scanned and weighed.

The data representing the weight generated by the scale member 27 and the identification data generated by the scanning mechanism 35 are transmitted over a cable 64 from the processing device 29 to the processor 52 which compares the weight of the merchandise item scanned with the weight stored in the memory unit 54 associated with the item, using the identification data read from the label. The processor 52 will also retrieve the price of the item from the memory 54. If the weight of the item is found to be correct, the display 32 (FIG. 1) will be actuated by the processor 52 to indicate such a condition together with the price of the item which is also stored in the processor 52 for use in totaling the amount due for the purchased merchandise items. The scanning mechanism 35 is also enabled to provide a new scanning operation. The processing device 29 may also generate audible signals to indicate such a condition. If a match is not made and/or the coded label is not read, audible and visible indications will be given by the processing device 29 to the customer to try again. Repeated failures to obtain a proper match results in the stopping of the operation of the scanner mechanism 35 until a store clerk investigates the cause of the problem.

After the weight of a merchandise item 62 has been successfully matched, the customer will place the merchandise item in the grocery bag 60 which has been positioned on the scale lid 31. The scale mechanism 33 will sense the positioning of the item on the scale lid 31 enabling the display 32 to generate a visible indication to the customer to place another item on the lid 26. After the scale motion stops, the data outputted by the scale mechanism 33 representing the combined weights of the items placed in the bag 62 is compared by the processor 52 with the combined weight generated by the processor 52 from the weight data generated by the scanner/scale 27. If the weights are within a predetermined value, such as 0.02 pounds, of each other, the scanner/scale 27 is enabled to scan and weigh the next purchased merchandise item positioned on the lid 26 by the customer. If the weights are not within 0.02 pounds of each other, the display 32 will generate an indication to the customer that any item placed on the lid 26 of the scale 27 must be returned to the shopping cart and the last item placed in the bag 60 be removed and the scanning operation be repeated. This scanning operation will be enabled only if the weight of the remaining items in the bag represents the proper combined weight.

When a customer fills the bag 60 with the purchased merchandise items, the customer pushes a button 66 (FIG. 3) on the processing device 29 which activates a printer that lists the items in the bag on a slip 65 along with a bag identification number. To speed the finalization of the checkout operation, the number could be in U.P.C. code. The customer puts the slip 65 in the bag 60. All item and bag weights are stored by the processor 52 as they are generated until the checkout operation is complete. When the bag 60 is removed from the scale lid 31, the scale mechanism 33 returns to a weight representing the tare weight of the bag and the scanner/scale mechanisms 27 and 35 are enabled.

The customer upon removing the bag 60 from the scale lid 31 places the bag in a second empty cart 68 and moves the cart to a position adjacent the scale lid 42 located on the counter 38 of the finalization station 36. The bag 60 is then placed on the scale lid 42 where the weight of the bag is transmitted to the data terminal device 44. The bag number printed on the slip 65 is also entered into the terminal device through the use of the keyboard 46 by a checkout clerk 70. If the transmitted combined weight associated with the bag number is within a predetermined value, such as 0.02 pounds, of the combined weight generated at the scanning station, and the items and prices associated with the bag number have been validated with the data stored in the processor 52, the checkout operation is completed by the displaying of the total price, of the merchandise items purchased in the display 48 of the terminal device 44, the issuance of a receipt by the printer 50 listing the items purchased and their price together with the total price, and the paying of the required amount by the customer. If the combined weights do not compare, the clerk 70 will cross-check the items in the bag 60 with the items listed on the slip 65. Additional security could be obtained by reweighing each item in the bag on the scale mechanism 33 (FIG. 1) when the bag weight cannot be validated.

It will be seen that this self-service checkout system uses the actual item weights of the purchased items to validate the merchandise items paid for and taken out of the store by the customer. The security achieved by the system is obtained by tracking purchased item weights through the checkout process with the weights obtained from the scale after scale motion has stopped. This arrangement overcomes the problem associated with item swapping if tracking is done only with a weight obtained from the memory unit 54. There are many different items that are in the same size containers, but no two items will have exactly the same weight.

While the principles of the invention have now been made clear in an illustrated embodiment, it will be obvious to those skilled in the art that many modifications of structure, arrangements, elements and components can be made which are particularly adapted for specific environment and operating requirements without departing from those principles. The appended claims are therefore intended to cover and embrace any such modifications within the limits only of the true spirit and the scope of the invention.

I claim:

1. A method for processing a plurality of purchased merchandise items each having a coded label identifying the merchandise item comprising the steps of:
    storing in a memory apparatus first data signals identifying each merchandise item and its weight;
    scanning the coded label on each merchandise item to generate second data identifying the merchandise item;
    placing each merchandise item on a first weighing apparatus to generate third data signals representing the weight of the item;
    comparing the first and third data signals representing the weight of the item;
    generating a first indication signal when the compared weights are within a first predetermined value;
    placing each item in a container positioned on a second weighing apparatus in response to the generation of said first indication signal;
    generating fourth data signals representing the combined weight of the merchandise items in the container;
    positioning the container on a third weighing apparatus;
    generating fifth data signals representing the combined weight of the merchandise items in the container positioned on the third weighing apparatus;
    comparing the fourth and fifth data signals; and
    generating a second indication signal indicating the end of the processing of the merchandise item when the compared fourth and fifth data signals are within a second predetermined value.

2. The method of claim 1 which further includes the steps of printing a record listing the merchandise items purchased and an identification number and checking the items purchased with the items listed on the record when the combined fourth and fifth data signals are not within the second predetermined value.

3. The method of claim 2 in which the first predetermined value is 0.02 lbs.

4. The method of claim 3 in which the second predetermined value is 0.02 lbs.

5. In a self-service checkout system in which each purchased merchandise item has a coded label identifying the item, a checkout system comprising:
    a first stationary support member;
    optical scanning means mounted in said first support member for scanning the coded label of a merchandise item and generating first electrical signals identifying the merchandise item;
    a first weighing means mounted on said first support member and operated by the purchaser of the merchandise items for generating second electrical signals representing the weight of the merchandise item being scanned;
    a storage member for storing first identifying signals identifying the merchandise item and second identifying signals identifying the weight of the merchandise item;
    processing means coupled to said storage member and said first weighing means for comparing the second electrical signals with the second identifying signals stored in said storage member, said processing means enabling said scanning means for operation when the compared signals are within a first predetermined value;
    second weighing means mounted on said first stationary support member operated by the purchaser of the merchandise items and coupled to said processing means for outputting to said processing means third electrical signals representing the combined weight of the purchased merchandise items;
    a second stationary support member located away from said first stationary support member;
    third weighing means mounted on said second stationary support member and coupled to said processing means for outputting fourth electrical signals to said processing means representing the combined weight of the purchased merchandise items, said processing means comparing said third and fourth electrical signals;
    first indicating means coupled to said processing means and positioned adjacent said second support member, said first indicating means being enabled by said processing means to indicate the completion of the checkout operation of the purchased merchandise items when the compared third and fourth electrical signals are within a second predetermined value; and
    second indicating means positioned adjacent the first stationary support member for indicating when the second electrical and identifying signals are within said first predetermined value, and printing means positioned adjacent the first stationary support member for printing a list of the items purchased and an identification number, said printing means operated by the purchaser of the merchandise items at the completion of the scanning of all of the merchandise items.

6. The checkout station of claim 5 in which said first support member further includes a storage area for storing containers used to store the purchased merchandise items, said container being positioned on said second weighing means for receiving each merchandise item scanned by said scanning means.

7. The checkout station of claim 6 in which said first indication means comprises a data terminal device which includes a keyboard for entering the identification number for identifying the purchaser of the purchased merchandise items.

8. The checkout station of claim 7 in which said first predetermined value is 0.02 lbs.

9. A checkout station of claim 7 in which said second predetermined value is 0.02 lbs.

10. In a self-service checkout system in which each purchased merchandise item has a coded label identifying the merchandise item, a checkout station comprising:
    a first checkout support member having a first supporting surface;
    a first scale member mounted on said first supporting surface generating first weight signals representing the weight of a merchandise item positioned on said scale member;
    an optical scanning member mounted in said first checkout support member adjacent said first scale member for generating first identification signals identifying the merchandise item positioned on said scale member as a result of scanning the coded label on the merchandise item;

memory means for storing second identification signals identifying the purchased merchandise items, and for storing second weight signals representing the weight of the merchandise item and price signals representing the price of the merchandise item;

processing means coupled to said first scale member, said scanning member and said memory means for comparing the first and second weight signals, and processing means enabling said scanning member for operation when the compared weight signals are within a first predetermined value;

a second scale member mounted on said first supporting surface and coupled to said processing means for outputting third weight signals to said processing means representing the total weight of all the purchased merchandise items;

first display means positioned adjacent the first supporting surface and coupled to said processing means for displaying instructions to the purchaser of the merchandise item concerning the weighing and scanning of the merchandise item together with the price of the merchandise item;

a second checkout support member having a second supporting surface;

a third scale member mounted on said second supporting surface and coupled to said processing means for outputting fourth weight signals to said processing means representing the combined weight of the purchased merchandise items, said processing means comparing the third and fourth weight signals; and a data terminal device positioned adjacent the second supporting surface and coupled to said processing means, said data terminal device including second display means for displaying the total price of the merchandise items purchased when the compared third and fourth weight signals are within a second predetermined value enabling the checkout operation of the purchased merchandise items to be completed.

11. The checkout system of claim 10 in which said first display means further includes printing means operated by the purchaser to print a record listing all of the merchandise items purchased and an identification number identifying the purchaser at the completion of scanning of all of the purchased merchandise items.

12. The checkout system of claim 11 in which first supporting surface further includes a storage area for storing containers used to store the purchased merchandise items, said container being positioned on said second scale member for receiving each merchandise item scanned by said scanning member.

13. The checkout station of claim 12 in which said first predetermined value is 0.02 lbs.

14. The checkout station of claim 12 in which said second predetermined value is 0.02 lbs.

* * * * *

UNITED STATES PATENT AND TRADEMARK OFFICE
CERTIFICATE OF CORRECTION

PATENT NO. : 4,779,706

DATED : October 25, 1988

INVENTOR(S) : Barry M. Mergenthaler

It is certified that error appears in the above-identified patent and that said Letters Patent is hereby corrected as shown below:

Column 6, line 30, delete "teremined" and substitute --termined--.

Column 7, line 11, delete "and" (second occurrence) and substitute --said--.

Signed and Sealed this

Fourteenth Day of March, 1989

Attest:

DONALD J. QUIGG

Attesting Officer

Commissioner of Patents and Trademarks